3,078,557
VEHICLE TIRES
Frederick Dickinson Estabrook, Lookout Mountain, Ga.
Original application Oct. 18, 1956, Ser. No. 616,762, now Patent No. 2,883,743, dated Apr. 28, 1959. Divided and this application Jan. 5, 1959, Ser. No. 785,079
1 Claim. (Cl. 29—238)

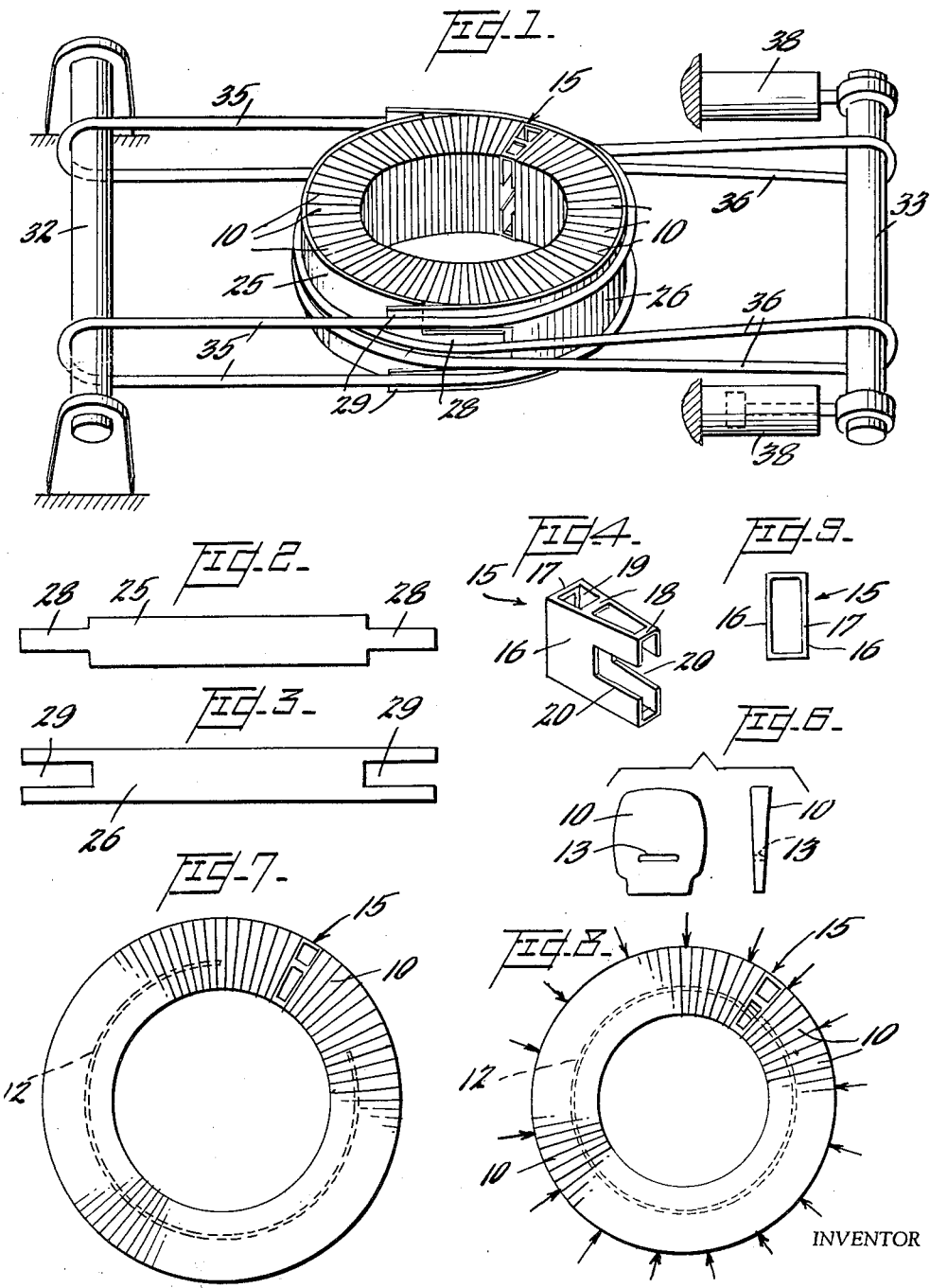

This invention relates to an improved method of making non-pneumatic or solid tires of the kind comprising a plurality of wedge-shaped slabs or sections of rubber or other resilient material, assembled in abutting face-to-face relation to form an annulus, the slabs being retained in assembled relation and under circumferential compression by a tension member of general circular form. The slabs are initially apertured for threading on the tension member, which may be a band, chain, or cable, the free ends of which are brought together and united.

The slabs or sections may be cut or stamped from discarded tire casings, the material of which is, of course, eminently suitable for the purpose, and solid tires useful on farm equipment, tractors, and the like may be cheaply produced from this inexpensive material. The chief difficulty arises in applying and maintaining compressive stress on the slabs during and after the step of securing together the free ends of the tension member; most of the proposals heretofore advanced in an attempt to obviate this difficulty are generally unsatisfactory, often wholly impractical. It is the primary object of the present invention to provide a novel apparatus for applying the requisite circumferential pressure on sectional solid tire annuli of the kind described.

In my prior copending application, Serial No. 616,762, filed October 18, 1956, now Patent No. 2,883,743, of which this application is a division, there is described and claimed a method of effecting assembly of a solid tire annulus of the type in question by assembling with the usual resilient slabs or sections a removable section, slotted to permit later withdrawal and formed to afford access to its interior, applying peripheral pressure to the annulus to compress the sections circumferentially and to bring the free ends of the tension member into close proximity or overlapping relation within the removable section, securing or uniting the ends of the tension member within the removable section while maintaining the circumferential pressure on the annulus, and thereafter withdrawing the removable section. The instant application is addressed to the improved apparatus disclosed in my prior application aforesaid whereby the requisite pressure is applied to the periphery of the assembled slabs during the step of securing the tension member in position.

Further objects and features of the invention will be apparent from the following description, taken in connection with the accompanying drawings, in which FIGURE 1 is a perspective view of apparatus suitable for use in the compression of tire annuli of the type described;

FIGURES 2 and 3 are plan views of elements shown in FIGURE 1;

FIGURE 4 is a view in perspective of a removable section suitable for use in the practice of the invention;

FIGURE 5 is a view in elevation of one end of the removable section shown in FIGURE 4;

FIGURE 6 is a front and side elevation of a conventional resilient section, and

FIGURES 7 and 8 are side elevations of a tire annulus before and after circumferential compression thereof.

To facilitate an understanding of the invention, reference is made herein to the apparatus and to the tire components illustrated in the drawing, and specific language is employed to describe the same. It will nevertheless be understood that no limitation of the scope of the invention is thereby intended, such further modifications, alterations and variants of both method and the apparatus employed in practicing the same being contemplated as would normally occur to those skilled in the art to which the invention relates.

The initial step in the practice of my improved method involves the threading of the apertured resilient sections 10 on a tension member 12. The sections shown in the drawing may have the external contour of the finished tire annulus and are wedge shaped or tapered, being assembled on a tension member 12 in face-to-face relation. Preferably the sections are formed of rubber and/or rubber reinforced with fabric, and each segment is provided with an aperture 13 of sufficient size to accommodate the tension member 12 freely, as shown in FIGURE 6.

It will be appreciated that the shape and material of the resilient sections may be varied widely. Preferably, as hereinbefore indicated, these sections are cut or stamped from the side walls of discarded pneumatic tire casings, having reinforcing threads embedded in the rubber to afford added strength and resistance to wear. The tension member may be a steel cable or band, a transmission chain, balance chain or bar link chain, or a metal rod or bar, although it is preferable that the tension member be readily flexed in order to facilitate assembly of the tire sections.

A significant feature of the invention claimed in my prior application is the use of a removable section, hereinbefore generally described, a preferred embodiment of removable section being illustrated in FIGURES 4 and 5 of the drawing, in which it is designated 15. It comprises a hollow structure having side walls 16 presenting flat external surfaces, united at one end by an outer end wall 17, and reinforced by struts 18 serving to maintain the side walls 16 in spaced relation. Preferably the side walls 16 converge so that the whole structure is wedge shaped, approximating the tapering of the resilient sections 10, but having a width considerably greater than that of a single resilient section. Each of the side walls 16 of the removable section is slotted as indicated at 20, so that when the removable section is assembled with the permanent resilient sections, the tension member 12 will be received within the slot thus formed, whereby the removable section may readily be withdrawn. It will be observed that the lateral edges of section 15 as shown at 19 are open to provide access to the interior of the removable section, as is the slotted inner edge, and as shown in FIGURE 5, the outer end wall 17 may also be cut away for this purpose. This is important in order that access may be had to the free ends of the tension member for the purpose of securing the same together, as hereinafter described.

In the preferred practice of the method of my prior application, the resilient sections 10 are threaded on a tension member 12 to form an annulus, the removable section 15 being inserted in the annulus at a point substantially midway of the ends of the tension member 12, as shown in FIGURE 7. It will be appreciated that at this juncture the segments are more or less loosely associated; consequently the assembling of the segments on the tension member may be readily achieved on a bench or table, or within a circular jig.

Flat strips 25, 26, having approximately the width of the annulus, and a combined length somewhat in excess of the outer circumference of the annulus, preferably formed of metal, are then applied against the periphery of the annulus with the ends of the strips overlapping slightly. It will be observed that strip 25 is formed at its ends with tongues 28 and that strip 26 is recessed at its ends, as indicated at 29, to receive the tongues 28, so that when assembled about the periphery of the annulus, these strips form a telescoping sheath, which may freely by reduced in diameter as the annulus is circumferentially compressed.

The sheathed annulus is then introduced in the operation shown in FIGURE 1 for the purpose of applying the requisite circumferential pressure to the ends. This apparatus is shown schematically as comprising a fixed bar 32 and a movable bar 33. Continuous flexible elements 35 and 36, called for convenience cables, are passed around the respective bars and about the circumference of the sheathed annulus as shown. The movable bar 33 is then displaced away from the fixed bar 32 by hydraulic jacks 38, each acting between the bar 33 and a fixed abutment, whereby tension is applied to the elements 35 and 36, with the results that the annulus is precompressed in a circumferential direction until the free ends of the tension member 12 are brought into close proximity within the removable section 15, strips 25 and 26 reducing the friction and distributing the pressure applied by elements 35 and 36. FIGURES 7 and 8 are illustrative of the effect produced on the annulus by the step of precompression achieved by relative displacement of bars 32 and 33.

Since the interior of the removable section 15 is readily accessible, the ends of the tension member 12 may now be secured in any convenient manner, for example by welding, by bolting, by attaching a suitable clamp, or, if the tension member is a transmission chain or the like, by insertion of a pin. The removable section 15 is, of course, so constructed as to resist the fairly high compression to which the annulus is subjected, this being slightly greater than that required in the finished annulus. When the ends of the tension member 12 have been securely united, the removable section 15 is then withdrawn, and strips 25 and 26 removed, leaving the annulus in a state of substantial circumferential compression which is maintained by the tension member 12.

Either during or after the assembly and compression of the annulus as described an inner rim or hub member may be introduced within the annulus to form a completed structure, ready for mounting either on a conventional vehicle hub or directly on the vehicle axle, but obviously the invention is not concerned with this phase of the process, since the annuli, completed as described herein, may be mounted later on a suitable supporting structure as may any other solid or non-pneumatic tire. The essence of the invention claimed in my earlier application resides in the provision of a method for assembling the separate resilient sections to form an annulus under substantial circumferential compression while overcoming the difficulties inherent in joining the ends of the usual tension member. This method is expedited and more effectively performed by the use of the apparatus claimed herein for effecting initial compression of the annulus.

It will be appreciated that the flexible elements 35 may assume any one of a variety of forms, steel cables being preferred, and that while the apparatus shown in FIGURE 1 has been found eminently suitable for use in the practice of the invention, in its broader aspect the invention contemplates the precompression of the annuli by equivalent means which may vary widely from that illustrated herein.

Having thus described the invention, what is claimed as new and desired to be secured by Letters Patent is:

In apparatus for precompressing a tire annulus comprising a plurality of resilient wedge shaped sections threaded on a tension member, prior to joining of the free ends of the tension member, the combination with a pair of spaced apart, relatively displaceable supports, of a telescoping flexible metal sheath adapted to embrace the periphery of an annulus interposed between said supports, a pair of cables extending about diametrically opposed portions of said sheath, the free ends of each cable extending parallel in the same direction and the free ends of the two cables extending in parallel but opposite directions, the free ends of each cable being secured to one of said supports, and means connected to one of said supports for effecting relative displacement of said supports to increase the spacing thereof to subject the interposed annulus to uniform peripheral pressure and to compress the sections thereof circumferentially.

References Cited in the file of this patent

UNITED STATES PATENTS

| | | |
|---|---|---|
| 189,176 | Beamer | Apr. 3, 1877 |
| 275,072 | O'Sullivan | Apr. 3, 1883 |
| 292,817 | Holmes | Feb. 5, 1884 |
| 1,204,402 | Burd | Nov. 14, 1916 |
| 1,260,490 | Warren et al. | Mar. 26, 1918 |
| 1,597,926 | Seifert | Aug. 31, 1926 |
| 1,644,755 | Stephenson | Oct. 11, 1927 |
| 1,667,620 | Bongs | Apr. 24, 1928 |
| 2,215,016 | Sammons | Sept. 17, 1940 |
| 2,359,446 | Scudder | Oct. 3, 1944 |
| 2,871,929 | Butler et al. | Feb. 3, 1959 |

FOREIGN PATENTS

| | | |
|---|---|---|
| 8,655 | Austria | Apr. 15, 1902 |
| 366,195 | France | July 3, 1906 |